United States Patent [19]

Buschmann et al.

[11] Patent Number: 4,661,918

[45] Date of Patent: Apr. 28, 1987

[54] TIMING DEVICE FOR PRINTING MACHINES

[75] Inventors: Falk Buschmann, Coswig; Karl-Heinz Foerster, Dresden; Volker Eichler, Weinhoehla; Hartmut Heiber, Radebeul; Volkmar Dittrich, Coswig, all of German Democratic Rep.

[73] Assignee: Veb Kombinat Polygraph "Werner Lamberz" Leipzig, Leipzig, German Democratic Rep.

[21] Appl. No.: 623,913

[22] Filed: Jun. 25, 1984

[30] Foreign Application Priority Data

Jun. 23, 1983 [DD] German Democratic Rep. ... 252271

[51] Int. Cl.[4] .................... G04G 3/00; G05B 11/26; B41F 5/00
[52] U.S. Cl. ................................ 364/569; 101/184; 364/523
[58] Field of Search ............. 364/565, 523, 569; 101/183, 184; 377/2; 250/231 SE

[56] References Cited

U.S. PATENT DOCUMENTS

| | | | |
|---|---|---|---|
| 4,116,125 | 9/1978 | Förster et al. | 101/184 X |
| 4,181,962 | 1/1980 | West, Jr. et al. | 364/565 |
| 4,496,989 | 1/1985 | Hirosawa | 364/523 X |
| 4,501,008 | 2/1985 | Rosseel et al. | 377/2 |
| 4,511,797 | 4/1985 | Pohlig et al. | 250/231 SE |
| 4,549,260 | 10/1985 | Saito et al. | 364/569 X |

FOREIGN PATENT DOCUMENTS 2220601 12/1972 Fed. Rep. of Germany ...... 364/523

Primary Examiner—Felix D. Gruber
Attorney, Agent, or Firm—Michael J. Striker

[57] ABSTRACT

A timing device for controlling the operation of printing machines comprises: an encoder disc for generating pulses correspnding to angular increments during one rotation of the machine; at least one encoder disc for generating a singular synchronizing or reference signal; address generating means including a counter reset by the singular synchronizing pulse and counting the angular increments to continuously produce a bindary coded address at its outputs; a second counter coupled to the encoder of angular increments via an AND-gate controlled by a monostable multivibrator to produce at its outputs a binary coded address corresponding to the rotary speed of the printing machine. The addresses from respective counters are fed via corresponding data buses to address inputs of a programmable read only memory. From the outputs of the PROM timing output signals are read out as a function of the angular position of the machine or the function of the angular position and of the rotary speed of the machine.

5 Claims, 4 Drawing Figures

TIMING DEVICE FOR PRINTING MACHINES

CROSS-REFERENCE TO RELATED APPLICATIONS

Reference is made to the copending related application Ser. No. 623,911 filed June 25, 1984; Ser. No. 623,912 filed June 25, 1984; and Ser. No. 623,914 filed June 25, 1985, all assigned to the same assignee.

BACKGROUND OF THE INVENTION

The present invention relates to a timing device for controlling the operation of a printing machine.

Known are numerous designs of decentralized timing devices for use in printing machines which are adjusted to a specific operational function of the machine such as for example the synchronized control of sheets, sequentially correct feeding and discharging of prints, time controlled sorting of sheets and the like.

Known is also a control system for multicolor rotary printing machines which controls the actuation of individual printing units with the machine or of individual functional groups in each printing unit so as to guarantee the passage of a sheet through the machine in correct sequence and at accurate time points. This known control system, described for example in the German Patent No. 2,220,601, employs an impulse stage for generating timing signals corresponding to an integer part of rotation of a cycle shaft of the machine that is to an integer angular position of the cycle shaft. The impulse stage consists of a signal generator, an interrogating circuit, a signal shaper and a closed shift register.

The disadvantage of this known system is its limited field of application. This known pulse stage is designed for controlling only one partial operation of the machine and consequently it is necessary to employ a large number of such timing devices in the printing machine.

Another disadvantage is to be seen in the fact that this known pulse stage generates only non-modified timing signals and cannot be used for the production of timing signals which are adjusted in response to the rotary speed of the machine, for example. This speed adjustment is necessary for the control of non-operative times of numerous setting members of the printing machine. Furthermore, in these prior art control devices it is necessary to use pulse shapers for generating pulses of different length but these pulse shapers can produce only a preset, non-adjustabe pulse length.

SUMMARY OF THE INVENTION

It is therefore a general object of the present invention to overcome the aforementioned disadvantages.

More particularly, it is an object of the present invention to provide an improved timing device for printing machines which is capable of generating from a central unit a large number of different timing pulses.

An additional object of the invention is to provide such an improved timing device which is simple in structure and inexpensive in manufacture.

A further object of the invention is to provide such an improved timing device which guarantees a high degree of reproducibility and a high resolution of angular increments.

Furthermore, an object of this invention is to provide such a central timing device for printing machines which readily enables the adjustment or modification of timing pulses for different operational groups in the machine.

In keeping with these objects and others which will become apparent hereafter, one feature of the invention resides, in a timing device for controlling the operation of a printing machine, in a combination which comprises a reference pulse generator for generating pulses related to a working cycle of the machine, the reference pulse generator including a generator of pulses corresponding to the incremental angles of rotation of the machine and at least one generator of singular timing pulses corresponding to a predetermined angular position of the machine during a cycle, and a device for processing the pulses from the reference pulse generator, the pulse processing device comprising means for generating binary addresses corresponding to momentary values of the reference pulses and a programmable read only memory (PROM) having inputs connected to the address generating means and outputs for reading out timing data stored in the PROM and correlated to the applied addresses.

The generator of pulses corresponding to incremental angles of rotation of the machine as well as the generator of signals corresponding to the predetermined angular position of the machine are, respectively in the form of encoders coupled to the cycle shaft of the printing machine. The output signals from respective encoders are combined in the address generating means so as to produce binary addresses corresponding to the consecutive angular increments and addresses corresponding to momentary angles of rotation of the machine. The address generating means includes also preliminary data word adjusting stages to modify the actual data sensed by the encoders. The address generating means also includes a monostable multivibrator connected to an input of an AND-gate whose other input is connected to the encoder of angular increments. The output of the AND-gate controls the address generating means for producing addresses pertaining to rotary speed of the machine.

The programmable read-only memory includes an address field pertaining to angular increments, and an address field pertaining to angles of rotation and to the rotary speed of a rotary the machine.

The pulse processing device also includes a selector of operational modes of the machine, arranged between the address generating means and the storing means. The selector includes a bus driver connected to the output of the address generating means, and a switch whose contacts are connected to each second input of the bus driver. In a modification, the operational mode selector consists of AND-gates coupled to the angular increment sensor and to a rotary speed counter, and a switch whose each second contact is connected to the corresponding second input of the AND-gate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
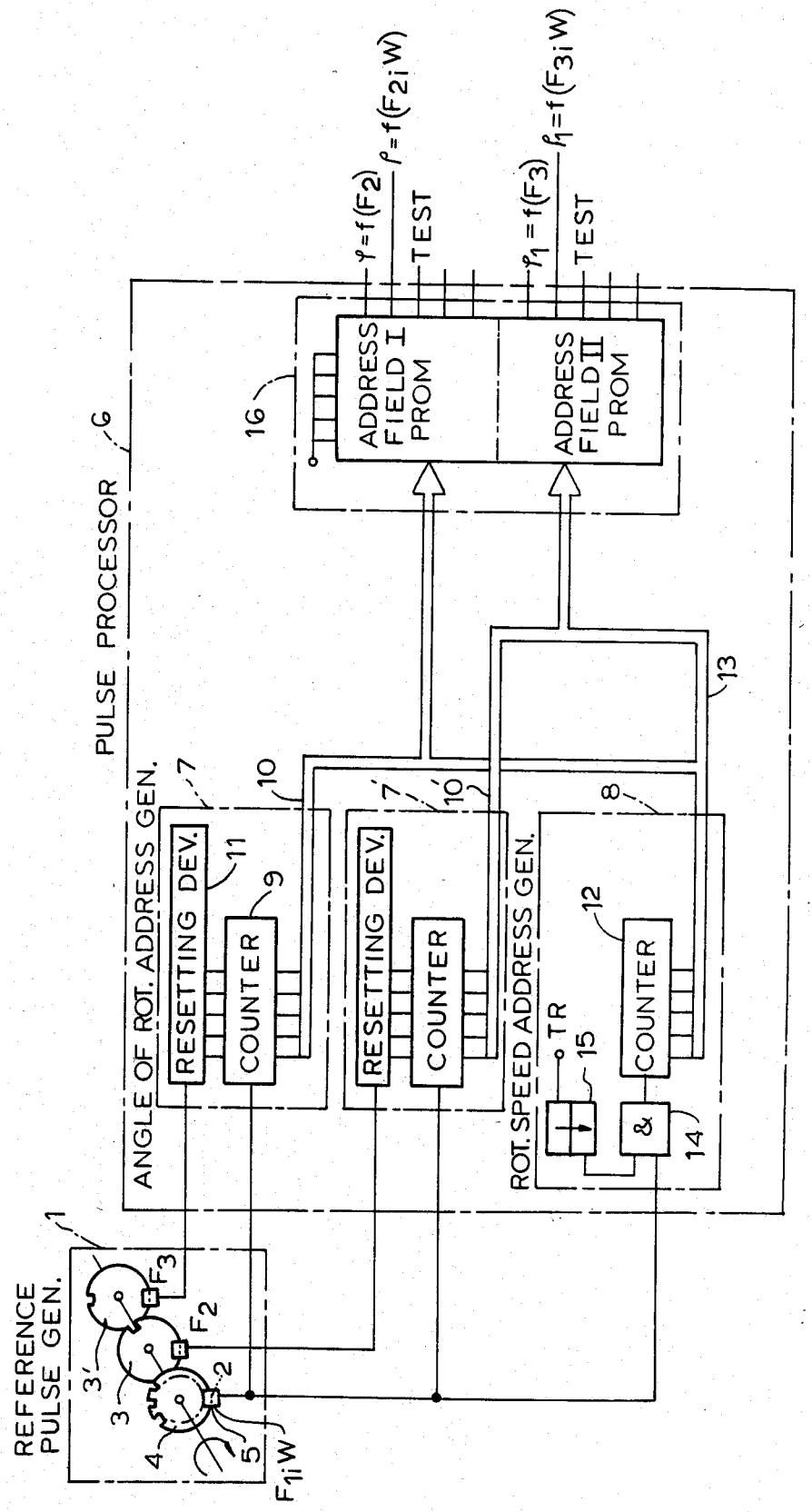
FIG. 1 is a block circuit diagram of a first embodiment of the timing device of this invention.

The timing device of this invention includes a reference pulse generator 1 consisting of a device 2 for generating signals corresponding to angular increments during one cycle of the printing machine, and of one or more devices 3 for generating singular synchronizing signals.

The device 2 for generating angular increment signals includes an encoder disc 4 having a slotted circumference for producing light and dark intervals which are sensed by means of a stationary sensor 5. Depending on the desired resolution the encoder disc 4 includes a predetermined number of light and dark coding segments of equal duration. In this example, the edge of the encoder disc is divided into 250 light and 250 dark coding segments corresponding to a resolution of $360°/250=1,44°$ angular increments $f_1$.

The sensing of the coding segment by the sensor 5 can be made for example in response to the leading edge of each coding segment.

The device 3 or 3' for generating singular synchronizing pulses employs similar encoder discs as the generator 2 for angular increment signals but is provided with a single coding segment only located at a point on the circumference of the disc corresponding to a desired angular position $f_2$ or $f_3$ of a rotary part of the machine.

In printing machines which are designed for printing on blanks or first forms only it is sufficient to employ only one generator 3 for generating timing pulses corresponding to a single angular position of the machine.

In printing machines which are designed for first form printing mode of operation and for the first form and printing on back mode of operation, there are necessary two generators 3 and 3' for generating singular synchronizing pulses. Machine part operating for the first form printing is controlled by the synchronizing pulses from one of the generators 3 and 3' and the other machine part printing on back is controlled by singular synchronizing pulses from the other generator.

The encoder discs 2, 3 and 3' are arranged on a common shaft connected to a suitable shaft in the machine, preferably to the so-called cycle shaft. Under the term cycle shaft is understood the part of the machine which performs one rotation during one working cycle of the machine.

The timing device of this invention further includes a pulse processor 6 including at least one device 7 for generating a binary address pertaining to an angle of rotation, and a device 8 for generating a binary address pertaining to the momentary rotary speed of the machine.

The devices 7 and 7' for generating addresses pertaining to rotary angles are of the same construction, each containing a counter 9 whose counting input is connected to the device 2 for generating pulses corresponding to angular increments. The parallel outputs of the counter 9 are connected to a data bus 10. Parallel setting inputs of counter 9 are connected to corresponding outputs of a resetting device 11 whose control input is connected to an assigned sensor of the encoder 3 or 3' generating the singular synchronizing pulses $F_2$ or $F_3$.

The device 8 for producing addresses pertaining to rotary speeds of the machine includes a counter 12 whose parallel outputs are connected to a data bus 13. The input of rotary speed counter 12 is connected to the output of an AND-gate 14 whose one input is connected to a monostable multi-vibrator 15. The multivibrator has a trigger input terminal TR. The other input of the AND-gate 14 is connected to the sensor 5 of the angular increment generator 2.

The pulse processor 6 further includes a storing device 16 in the form of a programmable read-only memory (PROM) whose addressing inputs are connected via the address data bus system 10, 13 to the address generating devices 7, 7' and 8. This programmable storing device 16 stores timing signals $f_1$ which are preprogrammed as a function of $F_2$ or $F_3$ or $F_2$ and W or $F_3$ and W whereby W is the angular speed of the cycle shaft of the printing machine. Upon addressing, the PROM 16 delivers corresponding timing signals $f_1$ at its signal outputs.

In addition, the storing device 16 has at least one output TEST connectable to testing instruments. The storing device 16 (PROM) has a conventional design consisting of the following functional blocks:

Storing matrix for storing one bit of the respective timing signals at each cross point;

Decoding circuit including column and row decoders. In this example, one row is addressed by the row decoder and a plurality of columns corresponding to the stored word length of the PROM, simultaneously addressed. The bits of information stored at the addressed crosspoints are applied to an output buffer;

The output buffer includes a plurality of amplifying stages for amplifying the read out word and supplying the amplified timing signal for further processing;

A Y-gating circuit which activates the columns of the matrix which have been addressed by the column decoder and process the stored contents to the output buffer.

In the embodiment illustrated in FIG. 1, the PROM storing device 16 includes two address fields I and II connected respectively to addresses buses 10 and 13.

Figure 2:
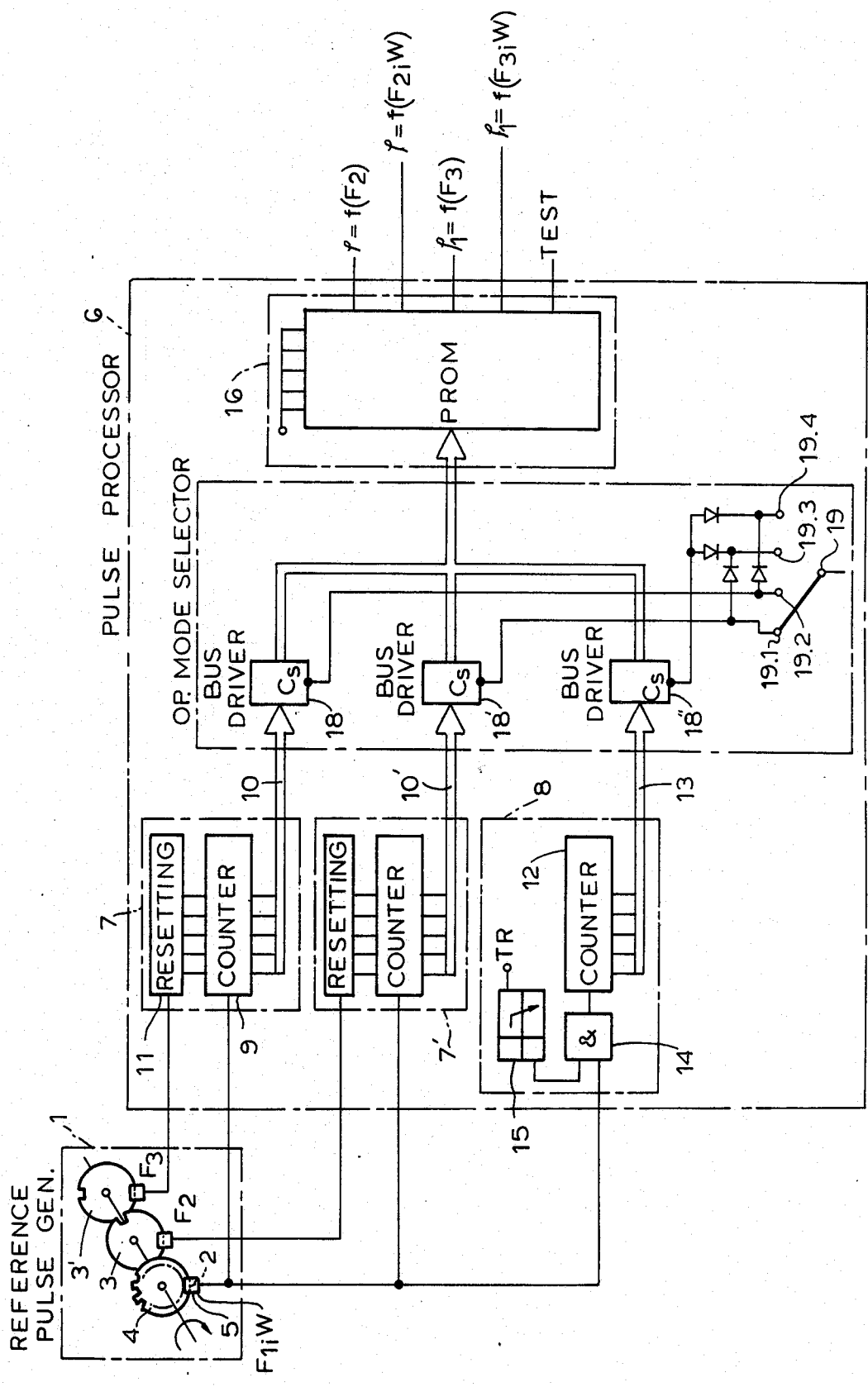
FIG. 2 is a block circuit diagram of another embodiment of the timing device of this invention having an operational mode selector connected before the storing device.

In the embodiment according to FIG. 2, the pulse processing circuit 6 includes an operational mode selector 17 connected between the address producing devices 7, 7' and 8 and the storing device 16. The operational mode selector 17 contains a switch 19 and as many bus drivers 18 as many address generating devices are present. The inputs of bus drivers 18 are connected via corresponding data buses to the assigned address generating device and the outputs of the bus drivers are connected to the storing device 16.

The switch 19 in this example has four contacts whereby the first contact 19.1 is connected to the control input of the bus driver 18' pertaining to the address generating device 7' for angles of rotation, thus making the bus driver 18' active. In the illustrated position of the switch 19 only the output $f_1=f(F_2)$ is read out. The second contact 19.2 of the switch 19 is connected to the control input of bus driver 18 assigned to the address generating device 7 for the second set of angular positions. The third contact 19.3 of the switch is connected to the control input of the bus driver 18'' pertaining to the address generating device 8 for angular increments and also is coupled to the bus driver 18' for the address generating device 7'. The fourth contact 19.4 of the switch is also coupled to the control input of the bus driver 18'' and in addition to the control input of bus driver 18.

Figure 3:
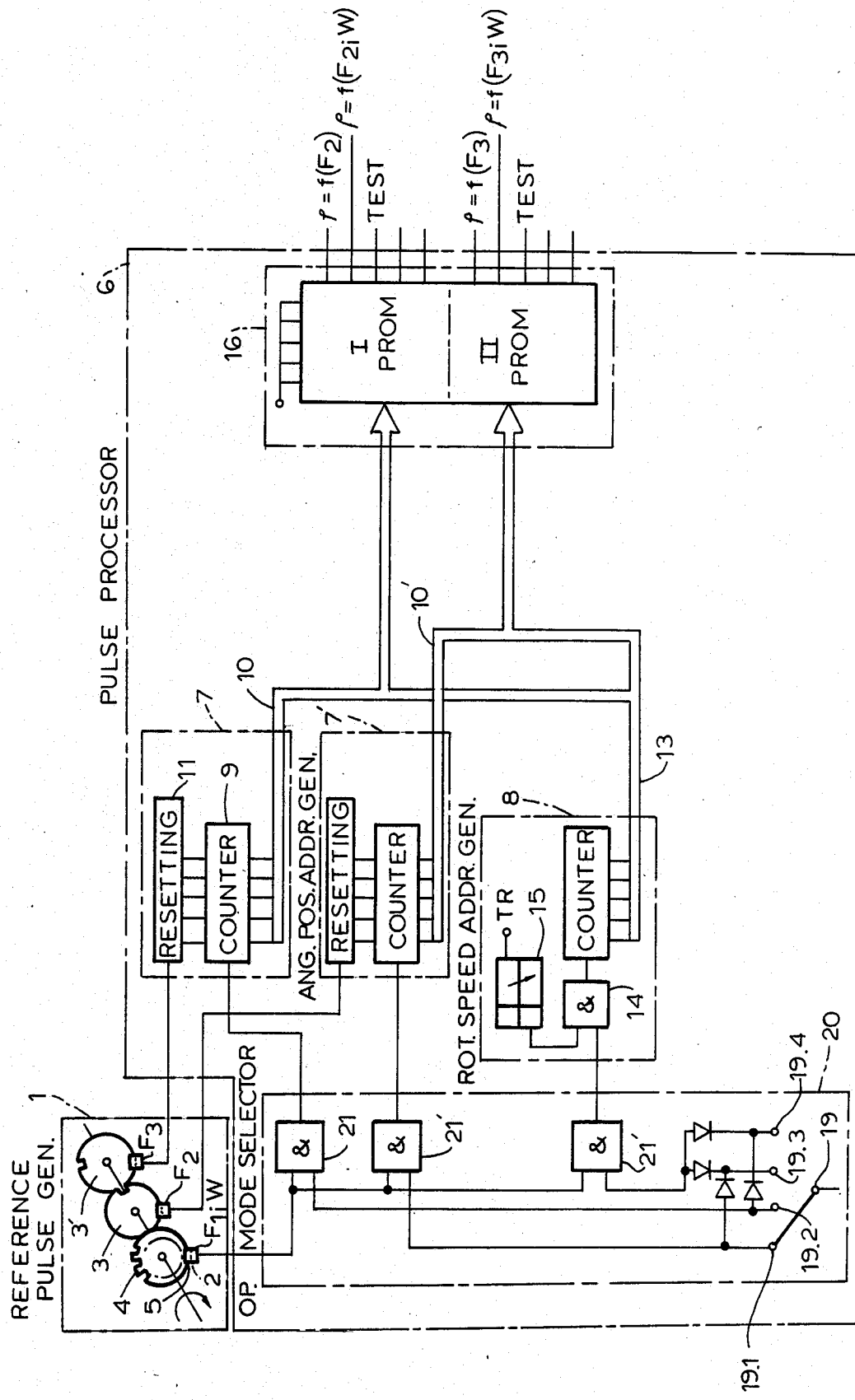
FIG. 3 is still another embodiment of the timing device of this invention having an operational mode selector connected to the counters.

In a modification of the timing device according to this invention shown in FIG. 3 the pulse processing circuit 6 is provided with an operational mode selector 20 which is connected between reference pulse generator 1 and the address generating device 7, 7' and 8 whereby the storing device 16 includes again two address fields I and II connected to the address generating devices in similar fashion as in the embodiment according to FIG. 1.

The operational mode selector 20 contains again a four-position switch 19 corresponding to that used in the embodiment according to FIG. 2. The contacts 19.1 through 19.4 of the switch are connected to the assigned address generating devices 7, 7' and 8 via AND-gates 21, 21' and 21''. The control inputs of the AND-gates are connected to the sensor 5 of the encoder 4 for generating angular increments.

The operation of the timing device according to this invention is as follows:

After the device 3 for delivering singular synchronizing pulses $f_2$ resets via preliminary resetting device 11 the counter 7' to zero, the counter 7' is made ready for counting pulses $F_1$ delivered by the device 2 for producing angular increments. The successive angular increments are continuously added in the counter 7' of the address generating device for angular position and the result of each addition is available in a binary code at the outputs of the counter 7'. Via the data bus 10 the binary address word is applied to the addressing inputs of the storing device 16 (PROM).

Accordingly, address data transmitted via bus 10 correspond to the momentary actual angular position of the cycle shaft of the printing machine (determined by the device 2 for generating angular increments), relative to a zero position determined by the singular synchronizing pulses $F_2$ or $F_3$ delivered by the devices 3.

During the rotation of the cycle shaft provided that divisions of the encoder disc 6 amount 1,44°, there are counted 250 angular increments in counter 7' and equal number of addresses is applied to the storing device 16 (PROM) and the stored contents at the 250 addresses is read out at the outputs of the PROM. By means of a conventional programming process in loading the programmable storing device 16 (PROM), a predetermined pattern of bits of timing signals $f_1$ stored at the 250 addresses of the storing matrix so that predetermined timing pulse sequences will result at the outputs of the PROM during operation of the printing machine. In this manner, the start and the end and hence the length of each timing pulse are programmable.

EXAMPLE

Figure 4:
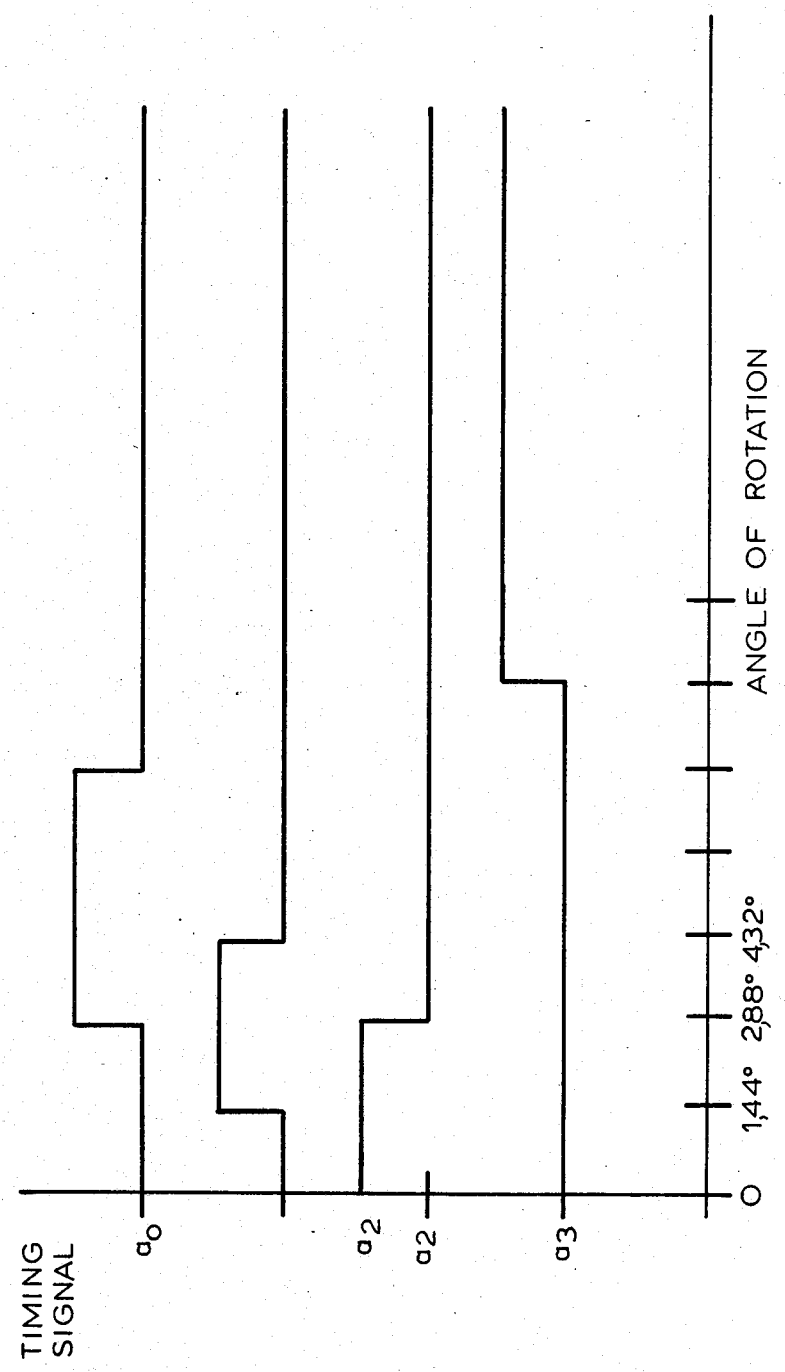
FIG. 4 shows a sequence of timing signals generated during a cycle of the printing machine.

Referring to FIG. 4, the following data are stored at individual addresses in the storing device 16:

| Address (Decimal) | Stored Contents | | | | | | | |
|---|---|---|---|---|---|---|---|---|
| 0 | 0 | 0 | L | 0 | 0 | 0 | 0 | 0 |
| 1 | 0 | L | L | 0 | . | . | . | . |
| 2 | L | L | 0 | 0 | . | . | . | . |
| 3 | L | 0 | 0 | 0 | . | . | . | . |
| 4 | L | 0 | 0 | 0 | . | . | . | . |
| 5 | 0 | 0 | 0 | 0 | . | . | . | . |

-continued

| Address (Decimal) | Stored Contents | | | | | | | |
|---|---|---|---|---|---|---|---|---|
| 6 | 0 | 0 | 0 | L | | | | |
| . | | | | | | | | |
| 250 | 0 | 0 | 0 | L | | | | |
| PROM output | $a_0$ | $a_1$ | $a_2$ | $a_3$ | $a_4$ | $a_5$ | $a_6$ | $a_7$ |

All outputs $a_1$ to $a_7$ are transferred via a data bus which in FIG. 1 is indicated by $F_1 = f(F_2)$. In FIG. 4, angular increments are indicated on horizontal axis and outputs $a_0$ to $a_3$ delivered at the first address field I of the PROM are indicated on the vertical axis. In the example of FIG. 1, $f_2$ (upper address field I) equals zero. Nevertheless, the operation of the device 7 for addresses pertaining to angles of rotation is the same as the beforedescribed device 7'. In this case, the output signals at the storing device 16 (PROM) are $f_1 = f(f_3)$.

Address data pertaining to rotary speed which are transferred by data bus 13 are produced in address generating device 8 as follows:

Pulses generated by device 2 sensing angular increments of the cycle shaft of the printing machine are applied to an input of the AND-gate 14. Monostable multivibrator 15 which is connected to the other input of the AND-gate 14 is triggered by a triggering pulse applied to its input terminal TR and makes the gate operative for its preset holding interval so that the pulses delivered by the angular increment sensing device 2 are applied to and counted by counter 12.

The counting result is available in binary form at parallel outputs of the counter 12 and is applied via data bus 13 together with addresses pertaining to angles of rotation from data bus 10, to addressing inputs of the storing device 16 (PROM) to read out contents stored at these addresses.

Data transmitted by the bus 10 correspond to momentary rotary speed of the cycle shaft of the printing machine. The address of the PROM is thus created by combining the address pertaining to the rotary speed and the address pertaining to the angle of rotation.

In the embodiment of FIG. 1 data bus 13 transfers four bits corresponding to a number of 16 different ranges of rotary speeds.

If it is desired to modify pulse sequences at the outputs $a_0$ to $a_7$ of the storing device 16 (PROM) in dependency on the rotary speed of the cycle shaft, it is necessary to use a PROM which includes n times 250 addresses, whereby n is the number of different ranges of the rotary speed. In this case, n = 16. The corresponding address for the PROM is assembled in a binary code as follows:

| $2^{11}\ 2^{10}\ 2^9\ 2^8$ | $2^7\ 2^6\ 2^5\ 2^4\ 2^3\ 2^2\ 2^1\ 2^0$ |
|---|---|
| Rotary Speed | Angle of Rotation |

Program stored in PROM has the following structure:

| | Address | Stored Contents |
|---|---|---|
| Rotary Speed Range 1 | 0 | 0 ... |
| | 1 | L |
| | . | . |
| | 250 | 0 |

|  | Address | Stored Contents |
|---|---|---|
| Rotary Speed Range 2 | 251 | L |
|  | 252 | 0 |
|  | . | . |
|  | 500 | 0 |
| Rotary Speed Range 3 | 501 | 0 |
|  | 502 | 0 |
|  | . | . |
|  | 750 | 0 |
|  | . | . |
|  | 3750 | 0 |
|  | . | . |
|  | 4000 | L . . . |
|  |  | $a_0\ a_1\ a_2\ a_3\ a_4\ a_5\ a_6\ a_7$ |

Each of the rotary speed ranges represents a rotation of the cycle shaft at a specific speed. By means of the corresponding programming of the programmable read only memory, it is possible for example to read out at the output $a_0$ a pulse for different values of the angle of rotation when another speed is measured. In this manner, a different rotary speed range can be read out.

By means of the operation mode selectors 17 or 20, it is possible to select at the output of the storing 16 the following timing signals:

In the first position of the switch 19 an address is applied to the address input of the PROM which pertains to an angle of rotation $f_1$ related to the angular position $f_2$. Accordingly at the output of the PROM timing signals $f_1 = f(F_2)$ are available.

In the second switching position of the switch 19 an address pertaining to the angle of rotation referred to an angular position $F_3$ is applied to the address inputs so that the timing signals at the output of the PROM are $f_1 = f(F_3)$.

In the third switching position of the switch 19 an address is applied to the address input of the PROM corresponding to $f_1$ relates to $F_2$ and rotary speed value w; consequently at the output the timing signals $f_1'f(F_2; w)$ are produced.

In the fourth switching position of the switch 19 the address applied to PROM is $f_1$ related to $F_3$ and the rotary speed W and at the output of the PROM signals $f_1 = f(F_3; w)$ are read out.

It will be understood that each of the elements described above, or two or more together, may also find a useful application in other types of constructions differing from the types described above.

While the invention has been illustrated and described as embodied in specific examples of the timing device for printing machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A timing device for controlling the operation of a printing machine, including a reference pulse generator for generating a sequence of pulses related to a working cycle of the printing machine, the reference pulse generator including a generator of pulses corresponding to incremental angles of rotation of a rotary part of the machine, at least one generator of singular synchronizing pulses corresponding to a predetermined angular position of the rotary part, and a device for processing the pulses from the reference pulse generator, the pulse processing device comprising address generating means and a programmable read-only storing device having addressing inputs connected to the address generating means and outputs for reading out timing signals stored at respective addresses, said address generating means including a first device for generating addresses pertaining to angles of rotation of the rotary part, the first device cooperating with the pulse generator for incremental angles of rotation and with the pulse generator for singular synchronizing pulses, a second device for generating addresses pertaining to rotary speed of the rotary part, the second device cooperating with the pulse generator for incremental angles of rotation and with the first device, and the read-only storing device being divided in as many addressing fields as many devices for generating addresses are present in the address generating means.

2. A timing device as defined in claim 1, wherein the first device for generating addresses pertaining to the angle of rotation comprises a counter having a data input connected to the pulse generator for incremental angles of rotation, setting inputs connected to a presetting device and to the pulse generator of signular synchronizing pulses, and parallel outputs connected to an output data bus for the angle rotation addresses.

3. A timing device as defined in claim 1, wherein the second device for generating addresses pertaining to rotary speed of the rotary part comprises a monostable multivibrator, an AND-gate having an input connected to the monostable multivibrator and another input connected to the pulse generator for incremental angles of rotation, a counter connected to the output of the AND-gate and having a plurality of parallel outputs connectable to a data bus for feeding to the storing device a binary coded address pertaining to the momentary speed of the machine.

4. A timing device as defined in claim 1, wherein the pulse processing device further comprises an operation mode selector connected between the address generating means and the programmable storing device, the operation mode selector comprising bus drivers connected to the address generating means and a multiposition switch for activating and deactivating the selected bus drivers.

5. A timing device as defined in claim 1, wherein the pulse processing device further comprises an operation mode selector, including a multiposition switch, a plurality of AND-gates each having an input connected to an assigned position contact of the switch and a second input connected to the pulse generator for incremental angles of rotation, the outputs of respective AND-gates being connected to the inputs of the address generating means.

* * * * *